United States Patent [19]
Temple et al.

[11] Patent Number: 5,859,154
[45] Date of Patent: Jan. 12, 1999

[54] RESINOUS COMPOSITION OF PHOSPHATIZED POLYESTER POLYMERS AND COATING COMPOSITIONS FOR IMPROVED ADHESION

[75] Inventors: Rodger G. Temple, Sarver; Paul H. Lamers, Allison Park, both of Pa.; H. Hayne Crum, III, Evansville, Ind.; Karen L. Wild, Yardley, Pa.

[73] Assignee: PPG Industries, Inc., Pittsburgh, Pa.

[21] Appl. No.: 938,542

[22] Filed: Sep. 26, 1997

[51] Int. Cl.[6] .................................................. C08F 283/00
[52] U.S. Cl. .......................... 525/509; 528/287; 528/302; 528/307; 528/308; 525/437; 525/538; 525/540
[58] Field of Search .................................. 528/287, 302, 528/307, 308; 525/437, 509, 538, 540

[56] References Cited

U.S. PATENT DOCUMENTS

| | | | |
|---|---|---|---|
| 4,101,526 | 7/1978 | Buxbaum et al. | 528/179 |
| 4,111,816 | 9/1978 | Login | 252/8.6 |
| 4,485,228 | 11/1984 | Chang et al. | 528/84 |
| 4,540,766 | 9/1985 | Chang et al. | 528/45 |
| 4,540,771 | 9/1985 | Ambrose et al. | 528/272 |
| 4,548,998 | 10/1985 | Chang et al. | 525/441 |
| 4,605,724 | 8/1986 | Ambrose et al. | 528/73 |
| 4,714,738 | 12/1987 | Chang et al. | 525/58 |
| 4,732,791 | 3/1988 | Blackburn et al. | 427/407.1 |
| 4,745,003 | 5/1988 | Sirkoch et al. | 427/54.1 |
| 4,760,111 | 7/1988 | Ambrose et al. | 524/738 |
| 4,788,107 | 11/1988 | Chang et al. | 428/447 |
| 4,859,743 | 8/1989 | Ambrose et al. | 525/443 |
| 5,096,556 | 3/1992 | Corrigan et al. . | |
| 5,106,469 | 4/1992 | Johnson . | |
| 5,242,751 | 9/1993 | Hartman | 428/324 |
| 5,336,314 | 8/1994 | Lamers . | |
| 5,356,718 | 10/1994 | Athey et al. . | |
| 5,356,973 | 10/1994 | Taljan et al. | 524/314 |
| 5,367,011 | 11/1994 | Walsh | 524/417 |
| 5,370,938 | 12/1994 | White et al. | 428/458 |
| 5,401,790 | 3/1995 | Poole et al. . | |
| 5,464,657 | 11/1995 | Athey et al. . | |
| 5,552,475 | 9/1996 | Sundararaman et al. | 524/608 |
| 5,574,102 | 11/1996 | Tanigami et al. | 525/124 |
| 5,593,785 | 1/1997 | Mayo et al. | 428/423.1 |
| 5,599,387 | 2/1997 | Neuman et al. | 106/287.14 |
| 5,608,027 | 3/1997 | Crosby et al. | 528/51 |
| 5,646,214 | 7/1997 | Mayo | 525/10 |

FOREIGN PATENT DOCUMENTS 6-108008   4/1994   Japan .

*Primary Examiner*—Samuel A. Acquah
*Attorney, Agent, or Firm*—Kenneth J. Stachel

[57] ABSTRACT

An adherent coating composition and method has a resin composition that is the polymerization reaction product of one or more polyhydric alcohols and two polybasic carboxylic acids and salt forming compounds of phosphorus. The carboxylic acid is comprised of at least adipic acid and phthalic anhydride in a mole ratio in the range of about 0.6:1 to about 3:1, and the phosphorus compound is present in the range of about 1 to about 5 weight percent of the resin composition. The resin composition can have a weight average molecular weight in the range of about 1100 to about 4000 and an acid value in the range of about 5 to about 40. Optionally, the resin can have up to about 35 weight percent of tetrahydrophthlic anhydride. The resin composition is ungelled and curable with crosslinking agents in an amount of about 30 to about 90 weight percent of resin to about 10 to about 45 weight percent of the crosslinking agent. These weight percents are based on the resin solids of the coating composition which is useful as a primer coating for substrates such as metal.

24 Claims, No Drawings

RESINOUS COMPOSITION OF PHOSPHATIZED POLYESTER POLYMERS AND COATING COMPOSITIONS FOR IMPROVED ADHESION

FIELD OF THE INVENTION

The present invention relates to resinous compositions of phosphatized polyester polymers containing adipic acid and phthlaic anhydride which are curable with crosslinking agents in a coating composition which is useful in automotive coatings, particularly primer coatings.

BACKGROUND OF THE INVENTION

The use of polyester polymers and their application in coatings compositions is well known in the art. Coatings utilizing polyester polymers can be advantageous over coatings with polyurethane and acrylic polymers for one or two basic reasons. Polyester polymers have the benefit of lower cost and lower volatile organic content (VOC) and depending on the required application have good durability, adhesion and appearance.

Even with these benefits, polyester containing coatings are more difficult to formulate at lower VOC's and higher solids while maintaining film properties. The desired film properties occur with the use of the higher molecular weight polyester polymers (on the order of 3500 to 5000 weight average molecular weight). The higher molecular weights also lead to increased VOC's and a lower paint solids which are undesirable environmentally.

It would be desirable to utilize polyester polymers which would be low in cost, higher in coating solids, lower in VOC while achieving the desired film properties such as adhesion. In addition, for automotive coatings, there is a need for a coating which will provide good durability, improved adhesion and lower VOC, especially during two-tone paint applications where a clearcoat may be directly applied to a primer or primer-surfacer layer.

SUMMARY OF THE INVENTION

The aforementioned object of the invention is accomplished by the resinous composition and coating composition containing same for the present invention. The described coating composition with a phosphatized polyester resin provides for improved adhesion, lower molecular weight, higher solids and lower VOC.

The resinous composition of the present invention is an ungelled resinous composition curable with a crosslinking agent comprising a polymerized reaction product of:

(a) at least one polyhydric alcohol component;

(b) at least two polybasic carboxylic acid components comprised of adipic acid; and phthalic anhydride in a ratio of about 0.6:1 to about 3:1; and (c) at least one salt forming phosphorus compound in an amount of about 1 to about 5 percent by weight of the resin solids of the polymerized reaction product, wherein the reaction product is a phosphatized polyester which has a weight average molecular weight of from about 1100 to about 4000, an acid value of from about 5 to about 40, and a hydroxyl value of from about 100 to about 200.

The coating composition presented by the current invention comprises a coating composition comprising a phosphatized polyester polymer containing adipic acid and phthalic anhydride and a crosslinking agent to cure the coating composition. Specifically, the present invention provides an adherent coating composition comprising:

(a) about 30 to about 90 percent by weight of a phosphatized polyester polymer containing adipic acid and phthalic anhydride wherein the mole ratio of adipic acid to phthalic anhydride is 0.6:1 to 3:1, and (b) about 10 to about 45 percent by weight based on the weight of resin solids of a crosslinking agent to cure the coating composition.

In addition, the present invention provides for a method of applying the coating composition of the present invention which incorporates the claimed resinous composition, particularly for automotive primers.

DETAILED DESCRIPTION OF THE INVENTION

The ungelled resinous composition provided by the present invention is produced by reacting one or more polyhydric alcohol components with at least two polybasic carboxylic acid components to form an acid or hydroxyl functional polyester which may then be reacted with a crosslinking agent. For the purpose of the present invention, the term "poly" includes the use of "di" functional materials. The reaction of the polyhydric alcohols with the polybasic carboxylic acids is performed at reaction conditions and amounts which are well known to those skilled in the art. Generally, the overall amount of the polybasic carboxylic acids can range up to 70 percent by weight of resin solids, and the overall amount of the polyhydric alcohols can range up to 60 percent by weight of resin solids. Values within these ranges are selected to give a total of 100 percent by weight for these alcohols and carboxylic acids monomers along with other components as discussed below. Also the term "polybasic carboxylic acid component" includes both the carboxylic acid and the anhydrides of those acids.

The curable ungelled resinous compositions of the present invention are phosphatized polyester polymers which are curable with a variety of crosslinking agents and are the polymerized reaction product of at least one polyhydric alcohol component and at least two polybasic carboxylic acid components. The term "ungelled" is meant to describe polymers which are soluble in organic solvents.

The polyhydric alcohols which are useful in forming the polyester have a functionality of at least two and typically contain from 2 to 16 carbon atoms, preferably from 2 to 8 carbon atoms. Such polyhydric alcohols include diols, triols, and higher functionality polyols. Useful diols include alkylene glycols, e.g., ethylene glycol, propylene glycol, butylene glycol, diethylene glycol, dipropylene glycol, triethylene glycol, neopentyl glycol, 2,2,4-trimethyl-1,3-pentanediol, and cyclohexanedimethanol. Triols and higher functionality polyols include trimethylolethane, trimethylolpropane, glycerol, 1,2,6-hexanetriol and pentaerythritol. Mixtures of polyhydric alcohols can also be used.

The polybasic carboxylic acids which are useful in forming the polyester have a functionality of at least two and typically contain from 2 to 36 carbon atoms. The polybasic carboxylic acids can be aliphatic or aromatic.

Examples of polybasic carboxylic acids are phthalic acid, isophthalic acid, terephthalic acid, succinic acid, glutaric acid, adipic acid, azelaic acid, sebacic acid, dimerized fatty acids and mixtures thereof. Typically, the aliphatic carboxylic acids contain from 2 to 36 carbon atoms and the aromatic carboxylic acids contain from 8 to 16 carbon atoms, (inclusive of the number of carbon atoms in the carboxyl group). Dicarboxylic acids are the preferred polybasic carboxylic acids, although minor amounts of higher functionality carboxylic acids, for example, trimellitic acid, can be included in admixture with the dicarboxylic acid.

In addition to the polybasic acids described above, anhydrides are particularly useful in the practice of the present invention in that they can be reacted with the polyhydric alcohols and polybasic carboxylic acids. Examples of useful anhydrides include phthalic anhydride, hexahydrophthalic anhydride, tetrahydrophthalic anhydride, succinic anhydride, trimellitic anhydride, 1,8-naphthalic anhydride, a $C_{16}$ to $C_{18}$ alkenylsuccinic anhydride and pyromellitic anhydride.

The phosphatized polyester polymers are produced by reaction of the polyhydric alcohols, polybasic carboxylic acid components and suitable salt-forming compounds of phosphorus. Such suitable acidic salt-forming compounds of phosphorus include but are not limited to phosphoric acid, phosphorous acid, phosphinic acid, phosphinous acid, organic acid phosphate, phosphorous oxychloride, alkyl esters of phosphoric acid, anhydrides of phosphoric acid, hydrogen-containing salts of phosphoric acid, hypophosphorous acid and mixtures thereof. The use of phosphoric acid is preferred.

The phosphatized polyester polymer of the present invention contains adipic acid and phthalic anhydride wherein the mole ratio of adipic acid to phthalic anhydride to from about 0.6:1 to about 3:1.

The use of tetrahydrophthalic anhydride in the phosphatized polyester polymer can be used in the amount of from 0 to about 35 percent by weight, preferably from 0 to about 30 percent by weight, and more preferably from 0 to about 20 percent by weight, with the percent by weight based on the total weight of the phosphatized polyester polymer. It is well known in the art that high levels of residual unsaturation in polymers, such as from tetrahydrophthalic anhydride, can result in a loss of outdoor weathering durability as described by Gerald & Scott in Polymer Degradation & Stability 8 (1995), pages 315–324 and Bauer J. Coating Tech., Vol. 66, 835, August 1994, pages 57–65.

The phosphatized polyester useful in the present invention can have an acid value of between about 5 and about 40, preferably between about 10 and about 30. In addition the phosphatized polyester can have a hydroxyl value of between about 100 and about 200. The acid value and hydroxyl values are determined by experimental titration with potassium hydroxide (KOH) and the results are represented as milligrams of KOH consumed per gram of sample. The amount of phosphoric acid reacted with the polyhydric alcohols and polybasic carboxylic acids is between about 1 to 5 percent by weight of the phosphatized polyester polymer. Amounts of phosphoric acid less than 1 percent adversely effect adhesion of the coating composition, while amounts greater that about 5 percent may impart too much conductivity to the coating composition making electrostatic application difficult.

The phospatized polyester polymer of the resinous composition can be prepared by a suitable esterification reaction that is normally carried out at temperatures between about 120° C. and 280° C., usually about 175° C. and 250° C. for a period of time ranging between about 3 hours and about 10 hours, usually under an inert gas atmosphere such as under nitrogen. Also conventional catalysts for the promotion of esterification reactions, such as, e.g., dibutyltin oxide, dibutyltin dilaurate, triphenyl phosphite, butyl stannoic acid and the like, can be used in catalytic amounts (e.g.: about 0.01 to about 1.0 percent by weight) to aid in the reaction. Minor amounts of a solvent, e.g., an aromatic solvent, such as toluene, xylene and the like, may preferably be used in preparation of the polyester polyol. Also conventional antiyellowing agents like triphenyl phosphite can be used.

In the practice of the present invention in addition to the phosphatized polyester of the resinous composition, the coating composition can optionally have polyol polymers in the amount of 0 to about 40 percent by weight of the coating composition. Such polyol polymers include urethane polyols, polyester polyols, polyether polyols, acrylic polyols, and mixtures thereof.

Urethane polyols which are useful in the present invention can be prepared by reacting an organic polyisocyanate with an active hydrogen containing material such as a polyol and/or polyamine to form a polyurethane, polyurea or mixed poly (urethane-urea).

The organic polyisocyanate which is used can be aliphatic including cycloaliphatic or aromatic polyisocyanate or a mixture of the two. Diisocyanates are preferred although higher polyisocyanates can be used in place of or in combination with diisocyanates. Examples of suitable polyisocyanates are 4,4'-diphenylmethane diisocyanate, toluene diisocyanate, 1,6-hexamethylene diisocyanate, isophorone diisocyanate, 4,4'-methylene-bis(cyclohexylisocyanate), trimethylhexamethylene diisocyanate and 1,2,4'-benzene triisocyanate. Isothiocyanates corresponding to the above described isocyanates can be employed as well as mixed compounds containing both isocyanate and isothiocyanate groups.

Active hydrogen containing materials which are reacted with the polyisocyanates include materials such as amines, amino alcohols, mercapto-terminated derivatives and polyols. The term "active hydrogen" refers to hydrogens which, because of their position in the molecule, display reactivity according to the Zerewitinoff test. Preferred active hydrogens include hydrogen atoms attached to oxygen, nitrogen and sulfur and thus useful compounds having at least two of the groups from the group of hydroxyl, thiol, and primary or secondary amines.

Polyester polyols which are useful are prepared by the polyesterification of organic polycarboxylic acids and anhydrides thereof with organic polyols. Polyols useful in preparing the polyester polyols include alkylene glycols, such as ethylene glycol, 1,4-butanediol, neopentyl glycol, trimethylolpropane and the like including mixtures thereof. In addition, the polyester polyols can be obtained from the reaction product of alkylene glycols with caprolactone.

Polyether polyols that can be used to prepare the polyester include diols such as alkylene glycols. Specific examples include ethylene glycol, diethylene glycol, triethylene glycol, and polyether glycols such as poly (oxytetramethylene)glycol, and the like. Although the polyol component can comprise all diols, polyols of higher functionality can also be used.

Acrylic polyols which can be useful are hydroxyl functional polymers derived from ethylenically unsaturated monomers. These polymers are acrylic copolymers of one or more hydroxy alkyl esters of acrylic acid or methacrylic acid, and, optionally, one or more other polymerizable ethylenically unsaturated monomers. Examples of hydroxy alkyl esters are hydroxyethyl acrylate and methacrylate and hydroxypropyl acrylate and methacrylate.

Examples of other polymerizable ethylenically unsaturated monomers include alkyl esters of acrylic or methacrylic acid including methyl acrylate, methyl methacrylate, ethyl methacrylate, butyl methacrylate, ethyl acrylate, butyl acrylate, and 2-ethylhexyl acrylate. Other polymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride; vinyl esters such as vinyl acetate; and acid functional monomers such as acrylic and methacrylic acid.

Hydroxyl functional monomers such as hydroxyethyl acrylate, hydroxypropyl acrylate, hydroxymethyl methacrylate, and hydroxypropyl methacrylate are copolymerized with the acrylic monomers to impart hydroxy functionality to the acrylic polymers mentioned above.

Crosslinking agents useful in the present invention are those that have functional groups that are reactive with active hydrogen containing moieties of the resinous composition. Examples of these active hydrogen containing crosslinkers include aminoplasts and/or blocked and unblocked isocyanates are previously mentioned above. Typical blocking agents known to those skilled in the art include oximes, triazoles, pyrazoles, caprolactams, malonates, and alcohols.

The crosslinking agents particularly useful in the present invention are aminoplast crosslinking agents which are obtained from the reaction of formaldehyde with an amine and/or an amide. Melamine, urea or benzoguanamine condensates are preferred. The aminoplast crosslinking agent has a plurality of functional groups, for example, alkylated methylol groups, that are reactive with the phosphatized polyester polymer of the present invention.

The preferred aminoplast crosslinking agent is a melamine-formaldehyde condensate that contains methylol groups that have been further etherified with an alcohol, preferably one that contains 1 to 6 carbon atoms. Any monohydric alcohol can be employed for this purpose, including methanol, ethanol, butanol, isobutanol and mixtures thereof.

The aminoplast crosslinking agent can be a fully or partially alkylated aminoplast crosslinking agent. The term "fully alkylated" is meant to describe that the alkylol groups associated with the reaction product of an aldehyde with an amine and/or an amide have been etherified to an extent that the alkoxy groups make up at least 80 percent by weight of the functional groups.

The phosphatized polyesters typically have a weight average molecular weight (Mw) of about 1100 to about 4000, preferably about 1200 to about 1700. The molecular weight is determined by gel permeation chromatography using a polystyrene standard. The surprising result is that the low molecular weight phosphatized polyester functions as a curable polymer to allow for higher solids, and lower VOC while providing physical properties similar to those that have been achieved in the prior art by the use of higher molecular weight polymers.

The coating composition can contain other optional ingredients, such as plasticizers; anti-oxidants; UV absorbers; surfactants; flow control agents; anti-settling agents; and the like. When present these materials are generally used at a level up to about 10 percent by weight, the percentages based on resin solids weight of the coating composition. In addition pigments may be optionally added to achieve a pigment to binder ratio of from 0 to about 1.8.

The use of phosphatized polyester obviates the need for the use of additional catalysts to cure the coating composition. As such, the coating composition of the present invention is essentially free of other acid catalysts.

The phosphatized polyester polymer and crosslinking agent are typically present in the range of about 40 to about 80 percent by weight based on the total solids weight of the coating composition of the present invention.

The coating composition can be applied to any of various substrates to which it adheres. Specific examples of suitable substrates include metals, wood, glass, cloth, plastic, foam, elastomeric substrates and the like. Typically, the substrate is metal or plastic.

The coating composition can be applied by conventional means including brushing, dipping, flow coating, spraying, and the like. Preferably the coating composition is applied by spraying. The usual spray techniques and equipment for air-spraying or electrostatic spraying can be used.

The coating composition can be applied as a clearcoat, basecoat or primer. The present invention is particularly useful as a primer during two-tone paint applications. When the coating composition is used as a primer, the primer is spray applied to a substrate at a uniform film thickness of from about 0.8 to about 1.2 mils. The primer is then "flashed", that is left to stand at temperatures ranging from ambient temperature to 80° C. for about 10 seconds to 30 minutes. The primer is then baked until the film is cured, typically from about 20 minutes to about 40 minutes at from about 120° C. to about 200° C. to produce a coated article. For basecoats, the typical film thickness is between about 0.5 to about 1.2 nils. For clearcoats, the typical film thickness is between about 1.5 and about 2.5 mils. Application conditions are similar to those mentioned for primer but can be modified to meet application requirements of the basecoat of clearcoat which are well known to those skilled in the art.

EXAMPLES

Illustrating the invention are the following examples that are not to be considered as limiting the invention to their details. All parts and percentages in the examples as well as throughout the specification are by weight unless otherwise indicated.

EXAMPLE A

| Ingredients | Weight in parts |
| --- | --- |
| Neopentyl glycol | 3870 |
| Trimethylol propane | 635 |
| Adipic acid | 1196 |
| Tetrahydrophthalic anhydride | 1630 |
| Phthalic anhydride | 1333 |
| Phosphoric acid (85%) | 269 |
| Butylstannoic acid | 0.96 |
| Triphenyl phosphite | 0.96 |

A suitable reaction vessel equipped with an appropriate agitator, a nitrogen blanket and a simple distillation setup was initially charged in order, at room temperature, with the above listed ingredients. The reaction mixture was then heated to 200° C., and water was removed by distillation. The reaction was held at 200° C. until an acid value between 30–32 (mg KOH/gm sample) was obtained. The reaction mixture was cooled and thinned to 80% theory solids with butyl acetate. The final properties are: 75.9% weight solids, an acid value of 26.6 (mg KOH/gm sample, a hydroxyl value of 180 (mg KOH/gm sample), and a weight average molecular weight (Mw) of 1350.

EXAMPLE B (Comparative)

| Ingredients | Weight in parts |
| --- | --- |
| Neopentyl glycol | 1248 |
| Trimethylol propane | 246 |
| Adipic acid | 438 |
| Tetrahydrophthalic anhydride | 597 |
| Phthalic anhydride | 488 |
| Phosphoric acid (85%) | 0 |
| Butylstannoic acid | 0.9 |
| Triphenyl phosphite | 1.8 |

A suitable reaction vessel equipped with an appropriate agitator, a nitrogen blanket and a simple distillation setup was initially charged in order, at room temperature, with the above listed ingredients. The reaction mixture was then heated to 200° C., and water was removed by distillation. The reaction was held at 200° C. until an acid value between 18–20 (mg KOH/gm sample) was obtained. The reaction mixture was cooled and thinned to 80% theory solids with Aromatic 100. The final properties are: 75.7% weight solids, an acid value of 25.0 (mg KOH/gm sample, a hydroxyl value of 167 (mg KOH/gm sample), and a weight average molecular weight, Mw, of 1254.

EXAMPLE C

| Ingredients | Weight in parts |
| --- | --- |
| Neopentyl glycol | 1483 |
| Trimethylol propane | 244 |
| Adipic acid | 710 |
| Tetrahydrophthalic anhydride | 624 |
| Phthalic anhydride | 255 |
| Phosphoric acid (85%) | 103 |
| Butylstannoic acid | 0.92 |
| Triphenyl phosphite | 2.0 |

A suitable reaction vessel equipped with an appropriate agitator, a nitrogen blanket and a simple distillation setup was initially charged in order, at room temperature, with the above listed ingredients. The reaction mixture was then heated to 200° C., and water was removed by distillation. The reaction was held at 200° C. until an acid value between 18–20 (mg KOH/gm sample) was obtained. The reaction mixture was cooled and thinned to 80% theory solids with Aromatic 100. The final properties are: 75.6% weight solids, an acid value of 14.5 (mg KOH/gm sample), a hydroxyl value of 146 (mg KOH/gm sample), and a weight average molecular weight (Mw) of 1692.

EXAMPLE D

| Ingredients | Weight in parts |
| --- | --- |
| Neopentyl glycol | 2833 |
| Trimethylol propane | 466 |
| Adipic acid | 878 |
| Tetrahydrophthalic anhydride | 1195 |
| Phthalic anhydride | 978 |
| Phosphoric acid (85%) | 198 |
| Butylstannoic acid | 1.76 |
| Triphenyl phosphite | 1.76 |

A suitable reaction vessel equipped with an appropriate agitator, a nitrogen blanket and a simple distillation setup was initially charged in order, at room temperature, with the above listed ingredients. The reaction mixture was then heated to 200° C., and water was removed by distillation. The reaction was held at 200° C. until an acid value between 18–20 (mg KOH/gm sample) was obtained. The reaction mixture was cooled and thinned to 80% theory solids with Aromatic 100. The final properties are: 76.7% weight solids, an acid value of 15.9 (mg KOH/gm sample), a hydroxyl value of 155 (mg KOH/gm sample), and a weight average molecular weight (Mw) of 1610.

Example 1

A coating composition was prepared by mixing together the following ingredients:

| Ingredient | Weight in grams |
| --- | --- |
| Resin from Example A | 117.0 |
| 2-butoxy ethanol acetate | 128.9 |
| Soybean Lecithin surfactant[1] | 1.2 |
| Titanium Dioxide[2] | 121.4 |
| Barium Sulfate[3] | 433.0 |
| Carbon Black[4] | 2.4 |
| Polyethylene Dispersion[5] | 3.0 |
| Talc[6] | 31.2 |
| Iminated methoxy melamine[7] | 88.1 |
| Cymel 1158[8] | 46.6 |
| Resin from Example A | 205.6 |
| Oxo-hexyl acetate | 23.6 |
| 2-butoxy ethanol acetate | 12.4 |
| Polybutyl acrylate[9] | 1.1 |
| Triethanolamine | 3.6 |
| 2-butoxy ethanol acetate | 30.14 |

Example 2 (Comparative)

A commercially available coating composition, GPX-5045 available from PPG Industries, Inc., was compared to Example #1. GPX-5045 is a high solids nonphosphatized polyester primer coating.

TABLE 1

| Coating Composition Example # | Total Solids[10] | VOC[11] | Adhesion[12] | Profilometer[13] |
| --- | --- | --- | --- | --- |
| 1 | 72.2% | 3.61 | 5/5/5 | 5.5 |
| 2 | 67.2% | 4.03 | 5/5/0 | 5.8 |

[10] The total solids content of the coating examples were determined using ASTM D2369-92 Standard Test Method for Volatile Content of Coatings. The total solids is the nonvolatile matter of the coating where the results are based on the total percent by weight of the coating.
[11] The volatile organic content (VOC) of the coating examples was determined using ASTM D3960-93 Standard Practice for Determining Volatile Organic Compound (VOC) Content of Paints and Related Coatings. The higher the number the higher the volatile organic content of the coating. Lower numbers are more desirable for environmental reasons.
[12] Adhesion was performed on panels containing two separately applied and baked coating layers. Adhesion was tested using a model P-A-T paint adhesion test kit from the Paul N. Gardner Company, Inc. equipped with a multiple tip cutter containing eleven teeth with a 1.0 mm spacing. The panels were scribed according to ASTM Standard Test Method D3359 and then Scotch Brand "898" tape from 3M Corporation was applied to the scribed area and then removed firmly in an attempt to pull any loose paint from the panel. The adhesion was then rated according to ASTM-D3359 (0=no adhesion, 5=perfect adhesion) at three different bake temperatures to simulate the following conditions: underbake (149° C. or 300° F.), normal bake (163° C. or 325° F.), and overbake (177° C. or 350° F.).
[13] The films were evaluated for smoothness using a Taylor-Hobson Surtronic 3P profilometer. Lower numbers indicate greater smoothness.

For the examples in Table I, the coating compositions were prepared as primers which were applied to electrocoated panels. The primers were applied at ambient temperature and flashed for 5 minutes at a film thickness of 0.8 mils. The panels were baked horizontally at the three aforementioned bake conditions. Bake time for the underbake and normal bake condition was 30 minutes, and the bake time for the overbake condition was 60 minutes. Profilometer testing was performed on the primed panels. Clearcoat was then applied at a film thickness of 1.9 mils in order to perform adhesion testing. The clearcoat applied was Diamond Coat™ available from PPG Industries, Inc.

As shown in Table I, the coating composition with the phosphatized polyester of the present invention gave equal appearance (profilometer) results at higher solids and lower VOC, plus improved adhesion under overbake conditions.

We claim:

1. A curable ungelled resinous composition curable with a crosslinking agent, comprising a polymerized reaction product of:
   a) at least one polyhydric alcohol component;
   b) at least two polybasic carboxylic acid components comprised of adipic acid; and phthalic anhydride in a ratio of about 0.6 to about 3:1;
   c) at least one salt forming phosphorus compound in an amount of about 1 to about 5 percent by weight of the resin solids of the reaction product, wherein the reaction product is a phosphatized polyester which has a weight average molecular weight from about 1100 to about 4000, an acid value from about 5 to about 40, and a. hydroxyl value of from about 100 to about 200.

2. Curable ungelled resinous composition of claim 1 wherein the phosphatized polyester has a weight average molecular weight from about 1200 to about 1700 and the acid value from about 10 to about 30.

3. Curable ungelled resinous composition of claim 1 wherein the phosphatized polyester is the reaction product of polyhydric alcohols comprised of neopentyl glycol and trimethylolpropane and of polybasic carboxylic acids comprised of adipic acid, phthalic anhydride and tetrahydrophthalic anhydride wherein the amount of tetrahydrophthalic anhydride is up to 35 weight percent of the resin solids of the phosphatized polyester.

4. A coating composition comprising:
   a) about 30 to about 90 percent by weight of a phosphatized polyester polymer produced from at least one polyhydric alcohol component and at least two polybasic carboxylic acid components containing adipic acid and phthalic anhydride wherein the mole ratio of adipic acid to phthalic anhydride is 0.6:1 to 3:1, and
   b) about 10 to about 45 percent by weight based on weight of resin solids of a crosslinking agent to cure the coating composition.

5. The coating composition of claim 4 wherein the percentage by weight of (a) plus (b) is in the range from about 40 to 80 percent total solids weight of the coating composition.

6. The coating composition of claim 4 wherein the phosphatized polyester has an acid value of between about 5 and 40.

7. The coating composition of claim 4 wherein the phosphatized polyester has an acid value of between about 10 and 30.

8. The coating composition of claim 4 wherein the phosphatized polyester has a hydroxyl value of from about 100 to about 200.

9. The coating composition of claim 4 wherein the phosphatized polyester derived by reacting about 1 to about 5 percent by weight based on weight of resin solids of phosphoric acid with polyhydric alcohols and polybasic carboxylic acids.

10. The coating composition of claim 4 wherein the phosphatized polyester contains from about 0 to about 35 percent by weight tetrahydrophthalic anhydride.

11. The coating composition of claim 4 wherein the phosphatized polyester contains from about 0 to about 30 percent by weight tetrahydrophthalic anhydride.

12. The coating composition of claim 4 wherein the phosphatized polyester contains from about 0 to about 20 percent by weight tetrahydrophthalic anhydride.

13. The coating composition of claim 4 wherein the coating composition optionally contains from about 0 to about 40 percent by weight based on weight of resin solids of polyol polymers.

14. The coating composition of claim 4 wherein the crosslinking agent is an aminoplast crosslinking agent.

15. The coating composition of claim 14 wherein the aminoplast is a condensate of melamine with formaldehyde and an alcohol containing from 1 to 6 carbon atoms.

16. The coating composition of claim 15 wherein the alcohol is selected from the group consisting of methanol, ethanol, butanol, isobutanol, and mixtures thereof.

17. The coating composition of claim 4 wherein the phosphatized polyester has a weight average molecular weight of from about 1100 to about 4000 as determined by gel permeation chromatography using polystyrene as a standard.

18. The coating composition of claim 4 wherein the phosphatized polyester has a weight average molecular weight of from about 1200 to about 1700 as determined by gel permeation chromatography using polystyrene as a standard.

19. The coating composition of claim 4 wherein the coating composition is a primer.

20. A method of applying a coating composition to a substrate wherein the coating composition comprises:
   a) about 30 to about 90 percent by weight of a phosphatized polyester polymer produced from at least one polyhydric alcohol and at least two polybasic carboxylic acids containing adipic acid and phthalic anhydride wherein the mole ratio of adipic acid to phthalic anhydride is 0.6:1 to 3:1, and
   b) about 10 to about 45 percent by weight based on weight of resin solids of a crosslinking agent to cure the coating composition.

21. The method of claim 20 wherein the coating composition percentage by weight of (a) plus (b) is in the range from about 40 to 80 percent total solids weight of the coating composition and the phosphatized polyester has an acid value of between about 5 and 40, and a hydroxyl number of from about 100 to about 200.

22. The method of claim 20 wherein the phosphatized polyester derived by reacting about 1 to about 5 percent by weight of phosphoric acid with polyhydric alcohols and polybasic carboxylic acids.

23. The method of claim 20 wherein the phosphatized polyester contains from about 0 to about 35 percent by weight tetrahydrophthalic anhydride.

24. The method of claim 20 wherein the crosslinking agent is an aminoplast crosslinking agent.

* * * * *